(12) United States Patent
Sathiananthan

(10) Patent No.: US 9,060,044 B2
(45) Date of Patent: *Jun. 16, 2015

(54) SYSTEM AND METHOD TO ACTIVELY TRANSFER VIDEO CONTENT ACROSS DEVICE DURING VIDEO PLAYBACK (ACTIVE PLAYBACK)

(75) Inventor: Brainerd Sathiananthan, San Jose, CA (US)

(73) Assignee: Smith Micro Software Inc., Aliso Viejo, CA (US)

( * ) Notice: Subject to any disclaimer, the term of this patent is extended or adjusted under 35 U.S.C. 154(b) by 462 days.

This patent is subject to a terminal disclaimer.

(21) Appl. No.: 13/562,113

(22) Filed: Jul. 30, 2012

(65) Prior Publication Data

US 2012/0297425 A1 Nov. 22, 2012

Related U.S. Application Data

(63) Continuation of application No. 12/491,978, filed on Jun. 25, 2009.

(60) Provisional application No. 61/075,743, filed on Jun. 25, 2008.

(51) Int. Cl.
| | |
|---|---|
| *G06F 15/16* | (2006.01) |
| *H04L 29/06* | (2006.01) |
| *H04N 21/2343* | (2011.01) |
| *H04N 21/2387* | (2011.01) |
| *H04N 21/414* | (2011.01) |
| *H04N 21/4402* | (2011.01) |
| *H04N 21/6547* | (2011.01) |
| *H04N 21/6587* | (2011.01) |
| *H04N 21/81* | (2011.01) |
| *H04N 21/845* | (2011.01) |
| *H04N 21/258* | (2011.01) |

(52) U.S. Cl.
CPC ........ *H04L 65/4084* (2013.01); *H04L 65/1093* (2013.01); *H04N 21/2343* (2013.01); *H04N 21/2387* (2013.01); *H04N 21/25825* (2013.01); *H04N 21/25875* (2013.01); *H04N 21/41407* (2013.01); *H04N 21/4402* (2013.01); *H04N 21/6547* (2013.01); *H04N 21/6587* (2013.01); *H04N 21/8193* (2013.01); *H04N 21/8455* (2013.01)

(58) Field of Classification Search
USPC .................. 709/231, 200, 203; 725/105, 153
See application file for complete search history.

(56) References Cited

U.S. PATENT DOCUMENTS

| | | | |
|---|---|---|---|
| 6,857,012 B2 * | 2/2005 | Sim et al. ....................... 709/222 |
| 8,271,676 B1 * | 9/2012 | Sathiananthan ............... 709/231 |
| 2007/0043847 A1 * | 2/2007 | Carter et al. ................... 709/223 |
| 2008/0091774 A1 * | 4/2008 | Taylor et al. ................... 709/203 |
| 2008/0235587 A1 * | 9/2008 | Heie et al. ...................... 715/719 |
| 2009/0293081 A1 * | 11/2009 | Pirani et al. ...................... 725/25 |

* cited by examiner

*Primary Examiner* — El Hadji Sall
(74) *Attorney, Agent, or Firm* — Farjami & Farjami LLP

(57) ABSTRACT

An active play system and method are provided that allow a piece of content to be transferred between multiple content devices associated with the user.

20 Claims, 5 Drawing Sheets

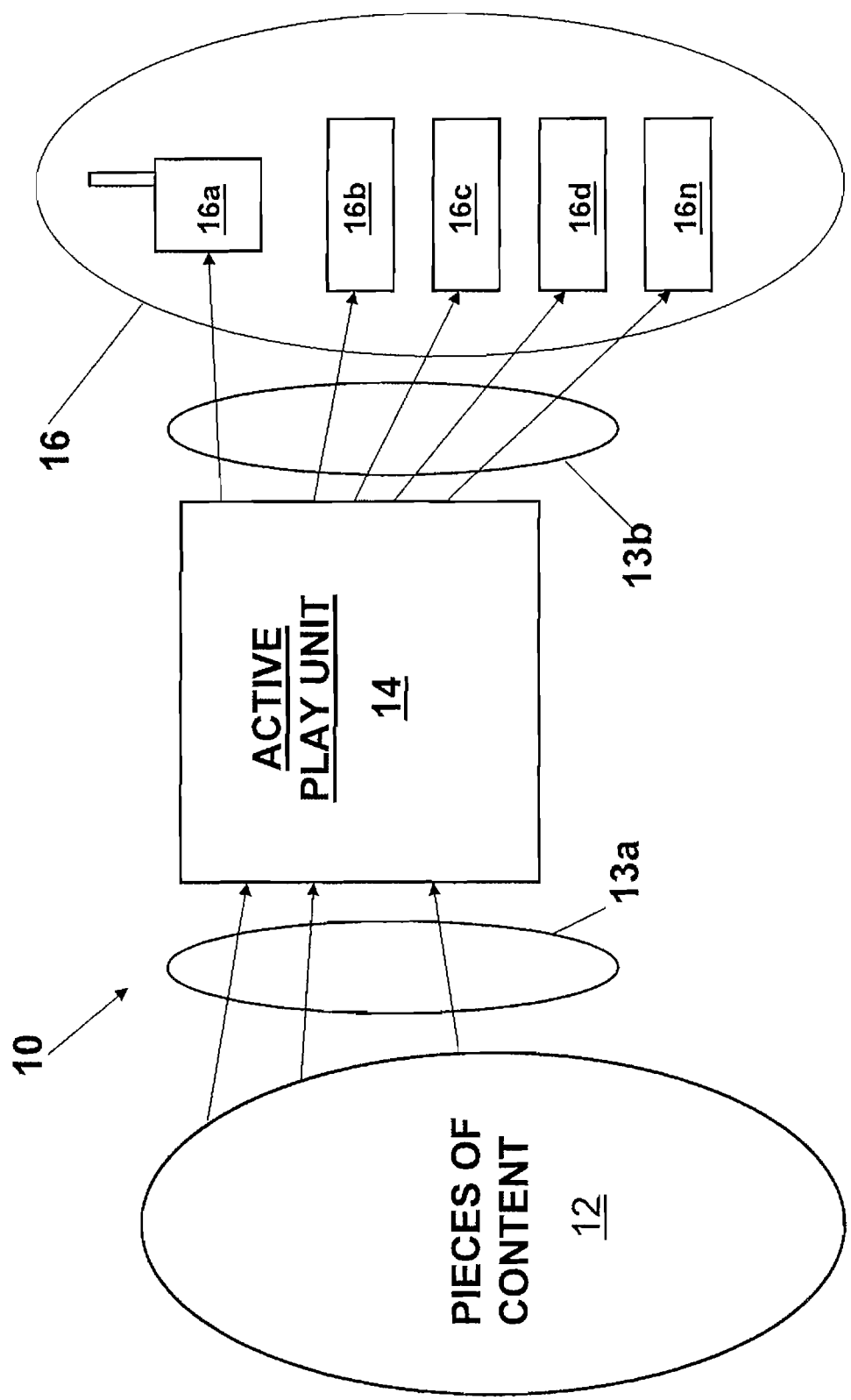

SYSTEM AND METHOD TO ACTIVELY TRANSFER VIDEO CONTENT ACROSS DEVICE DURING VIDEO PLAYBACK (ACTIVE PLAYBACK)

PRIORITY CLAIMS

This application is a Continuation of U.S. application Ser. No. 12/491,978, filed Jun. 25, 2009.

This application claims the benefit under 35 USC 119(e) and priority under 35 USC 120 to U.S. Provisional Patent Application Ser. No. 61/075,743, filed on Jun. 25, 2008 and entitled "System and Method to Actively Transfer Video Content Across Device During Video Playback (Active Playback)", the entirety of which is incorporated herein by reference.

FIELD

The system and method relate to a media distribution and playback system and method.

BACKGROUND

There is a lot of media on the Internet today. With sites such as YouTube, the amount of video playback has suddenly increased to a phenomenal extent. The same demand for video has also now spread to devices. This phenomenon increases the need to share currently playing video content from a device to another device as the user begins to change his/her consumption of the media and to suit his/her device in use at that moment. Thus, it is desirable to provide a system and method to actively transfer video content across device during video playback and it is to this end that the system and method are directed.

BRIEF DESCRIPTION OF THE DRAWINGS

FIG. 1 illustrates an active play system;

DETAILED DESCRIPTION OF ONE OR MORE EMBODIMENTS

Figure 2B:
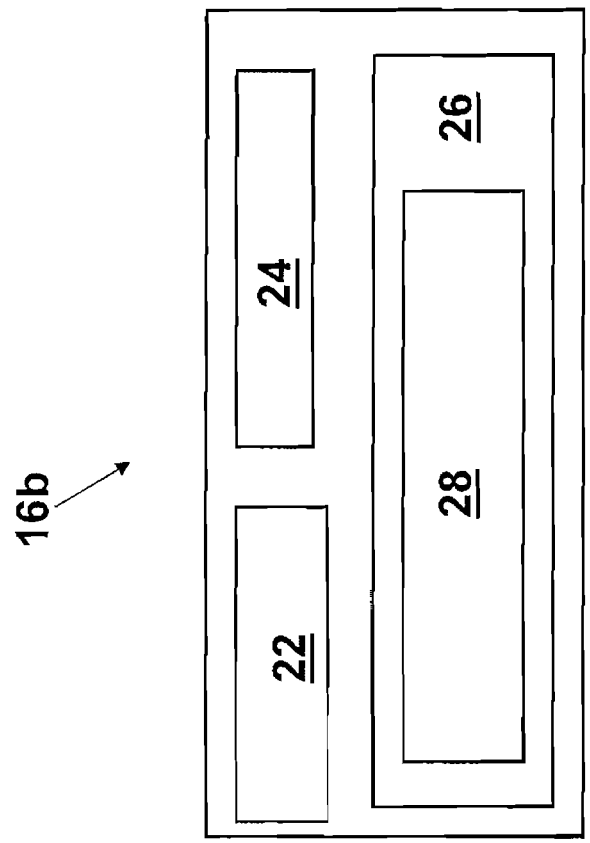
FIGS. 2A and 2B illustrate two different content devices that can be used with the active play system.

The active play system and method are particularly applicable to distribution video content and it is in this context that the active play system and method will be described. It will be appreciated, however, that the active play system and method has greater utility since it can be used to distribute any type of digital media such as to audio data, textual data and the like.

FIG. 1 illustrates an active play system 10 in which a corpus of content 12 may be played, through an active play unit 14 (that is coupled to the corpus of content 12 over a link 13a such as a computer network, a communications network, a cable network or a satellite network) to one or more content devices 16 over a link 13b such as a computer network, a communications network, a cable network or a satellite network. The corpus of content 12 may include content on servers, content on web sites and any other digital content. The active play unit 14 may be, for example, one or more server computers that execute a plurality of lines of computer code to implement the operations of the active play unit as described below. For example, the one or more content devices 16 may include a mobile device with phone capabilities 16a such as smart phones, Blackberry devices, Apple iPhones, mobile phones, cellular phones, etc., a set top box device 16b, a game device 16c, such as PSP or Xbox, a web site/application 16d such as Facebook or a desktop 16n as shown in FIG. 1. Each content device may be a processing unit based device with sufficient memory, processing power, display capabilities and connectivity that can display the content. The different content devices 16 have different characteristics such as different user interfaces (displays and software generated user interfaces), different networks and network speeds (EDGE, SMS, TCP/IP, cable), and different input devices such as a scroll ball or a keyboard or soft keys. Thus, when a piece of content is distributed to each content device, the piece of content may need to be configured so that it can be displayed appropriately by each content device. The active play system allows the content from the corpus 12 to be played on each of the various different content devices, Furthermore, the active play system allows a user to transfer/synchronize content being played by the user to be transferred between the various content devices owned by the user. For example, the user may start viewing the content on a cell phone (wherein the content is configured and formatted for the particular cell phone), enter his/her home, have the active play system determine the point in the content when the user stops viewing the content on the cell phone, reconfigure/reformat the content for a set top box device in the user's house and then start displaying the content on a television attached to the set top box at the location at which the user stopped watching the content on the cell phone.

Figure 2A:
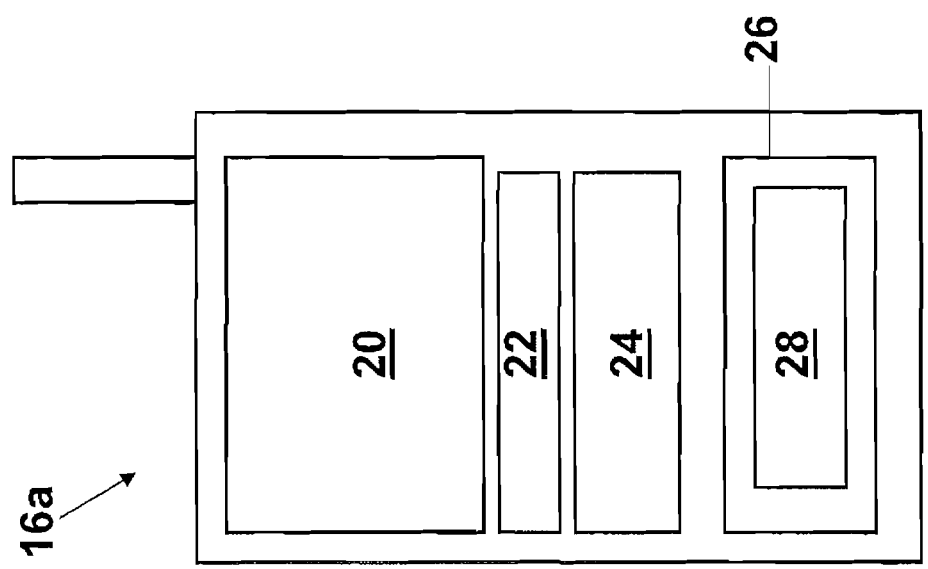

FIGS. 2A and 2B illustrate two different content devices that can be used with the active play system. The mobile device with phone capabilities 16a is shown in FIG. 2A that has a display 20 such as a LCD, a processing unit 22 such as a CPU, a persistent storage unit 24 such as a hard disk drive, flash memory, etc., a memory unit 26 such as SRAM or DRAM that store an active play client 28 which is a piece of software having a plurality of lines of computer code, downloaded to the content device that allows the content device to interact with the active play unit 14. The set top box 16b shown in FIG. 2B has similar elements (including the active play client) to the mobile device with phone capabilities 16a as shown in FIG. 16a. For the set top box 16b, the content, such as video, is actually displayed on a television or computer monitor screen (not shown) that is coupled to the set top box.

Figure 3:
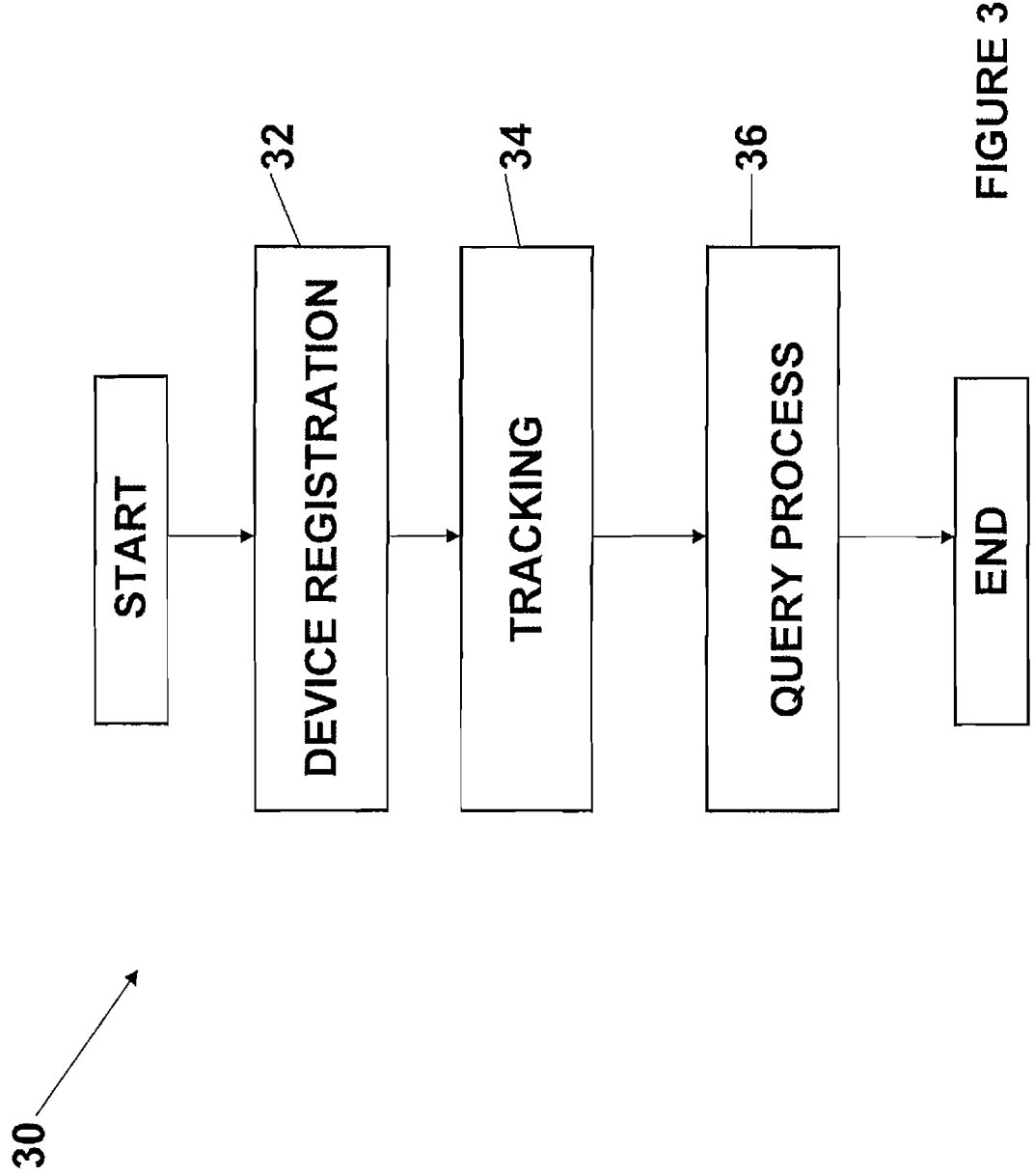
FIG. 3 illustrates a method for active play.

FIG. 3 illustrates a method 30 for active play that may be carried out by the active play unit in combination with the active play client that is associated with each content device once the content device is registered with the active play system (32), During the registration (that may be IP protocol based), each new content device is identified uniquely and then the active play client is downloaded to the content device. The identification of the device is performed by inspecting the HTTP header request form the device and matching the signatures to a database of signatures for various devices. There is also a configuration on the database about the formats and protocols suitable for each device. In addition, the content devices that can share content (such as the content devices owned by the same user or content devices owned by different users) are associated with each other during the registration process. The operations and functionality of the active play system are accomplished using the active play unit in combination with the active play clients in each content device. When the user is playing content on any of the content devices associated with the active play system, the system tracks the location of the user in the piece of content (34). Thus, when the user is viewing the content on a television associated with a set top box, the active play client in the set top box periodically sends back information to the active play unit indicating the location in the content of the user. For example, in one embodiment, the active play client may send back time codes to the active play unit to track the location in the content of the user.

In the method, different types of content are sent over different protocols and therefore the method for extracting the time codes may be different. For example, a piece of content may be distributed using a known real time streaming protocol (RTSP) in which the time codes can be easily extracted from the content, whereas for a piece of content distributed using the known hypertext transfer protocol (HTTP), the headers of the data are decoded in order to extract the time codes. For content distributed over a cable protocol (Vod or MPEG/10) the time codes can be extracted from the headers. There are several methods to associate time codes with video content. For fixed video files, the time codes are present in the container header structure (Ex: Flash) and for streamable content, the time codes are usually attached to the elementary video streams in the form of presentation timestamps (PTS).

Returning to FIG. 3, when a user of the active play system requests a particular piece of content on a particular content device, that content device (using the active play client) performs a query (36) to determine if the particular piece of content is part of the active play system by querying an active play store (shown in FIG. 4 and described below). If the content is not part of the active play system, then the content is downloaded, data about the content inserted in to the active play store, and the content is by the content device with time codes for the location of the user sent back to the active play unit. If the content is part of the active play system, then the data about the particular content (described in more detail with reference to FIG. 4) is retrieved so that the content can be restarted on the content device with the format appropriate for the content device and at the location at which the user left off with the prior content device. For example, a user can play content on a phone (with the appropriate format for the phone) and then transition the content viewing to a television associated with a set top box that is part of the active play system. Alternatively, the user may watch a first portion of a video on a phone and then, two weeks later, resume watching the same video on the same phone or on a different content device. The Active Play unit 14 may contain a store (as shown below in FIG. 4) that contains device and corresponding format information so that, when a device connects to the unit 14, the unit 14 determines the format from this store and the requests the transcoder and the quantizer for a video stream matching that format. These units will produce a video stream to match the format on the fly. If the cache setting is enabled then the local cache is searched for such a stream before requesting the transcoding unit. The transcoder and quantizer units (that are part of the active play unit 14) are described in more detail in U.S. patent application Ser. No. 12/235,107 filed on Sep. 22, 2008 entitled "Video Streaming Apparatus with Quantization and Method Thereof", U.S. patent application Ser. No. 12/235,118, filed on Sep. 22, 2008 entitled "Transducer Unit and Method" and U.S. patent application Ser. No. 12/235,129, filed on Sep. 22, 2008 entitled "Video Quantizer Unit and Method Thereof", all of which are incorporated herein by reference.

Figure 4:
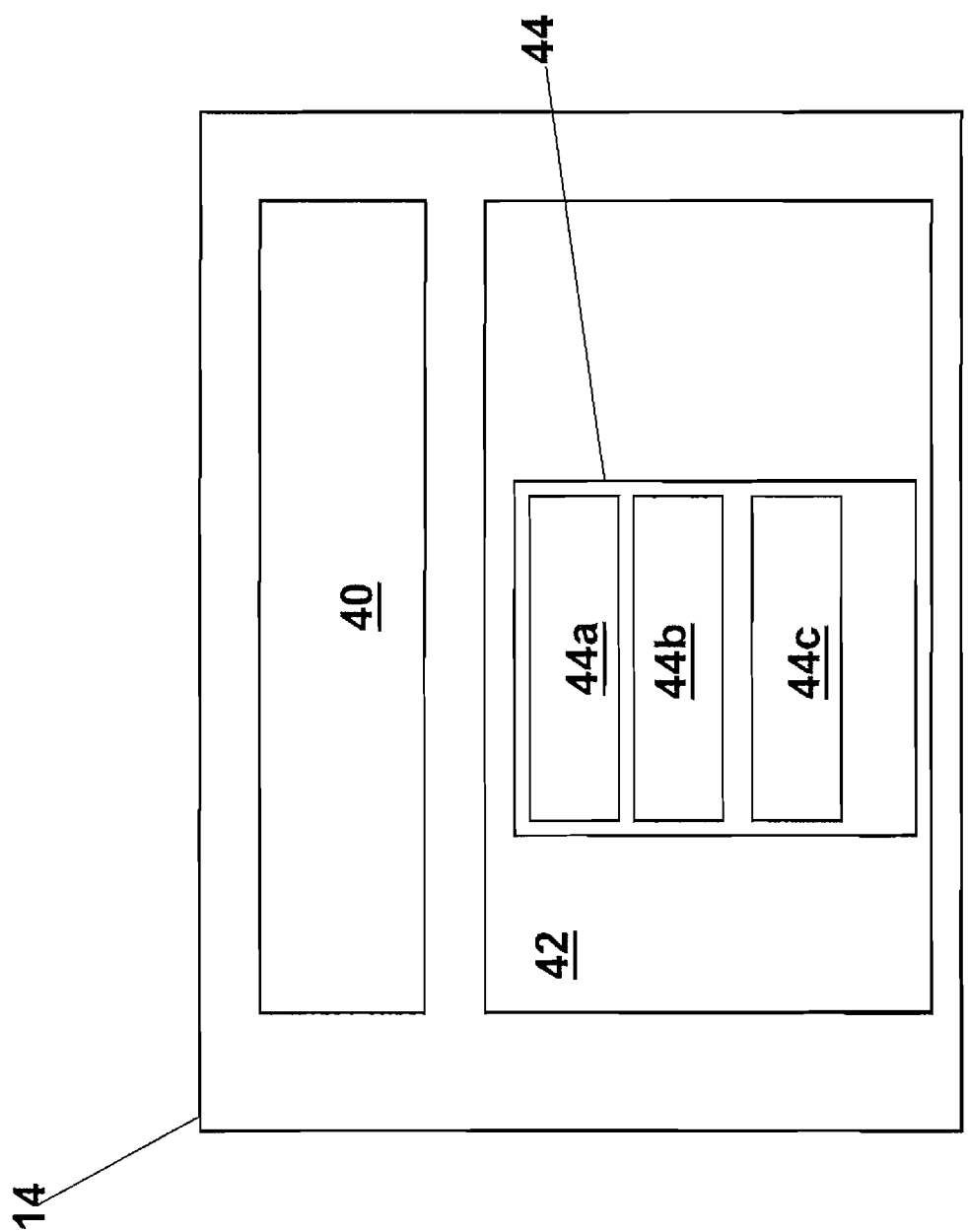
FIG. 4 illustrates an example of more details of the active play unit.

FIG. 4 illustrates an example of more details of the active play unit 14 that may be, for example, one or more server computers in one embodiment that execute a plurality of lines of computer code to implement the processes described above in FIG. 3. The active play unit 14 may comprise typical elements of computer based system including, but not limited to one or more processing units 40 and a memory 42 that stores a active play content store 44 that may be implemented in one embodiment as a known software database. The active play content store 44 may include, for each piece of content that is associated with the active play system, a user identifier 44a, a content identifier 44b and one or more timestamps/time codes 44c associated with the piece of content. The active play content store 44 may optionally store the pieces of content. The data associated with each piece of content associates each piece of content with a particular user of the active play system (so that there may be multiple records for a piece of content when different users have the same piece of content) and tracks the time codes/time stamps for each piece of content associated with each user. Due to the registration process described above for FIG. 3, the active play system can uniquely identify a unique user across one or more content devices. In addition, for the user identifier of the active play unit, the user identifier may associate different third party identifiers (such as a Facebook identifier, a Avot Media identifier, etc.) with the active play system identifier so that the active play system can pull content from various sources.

Figure 5:
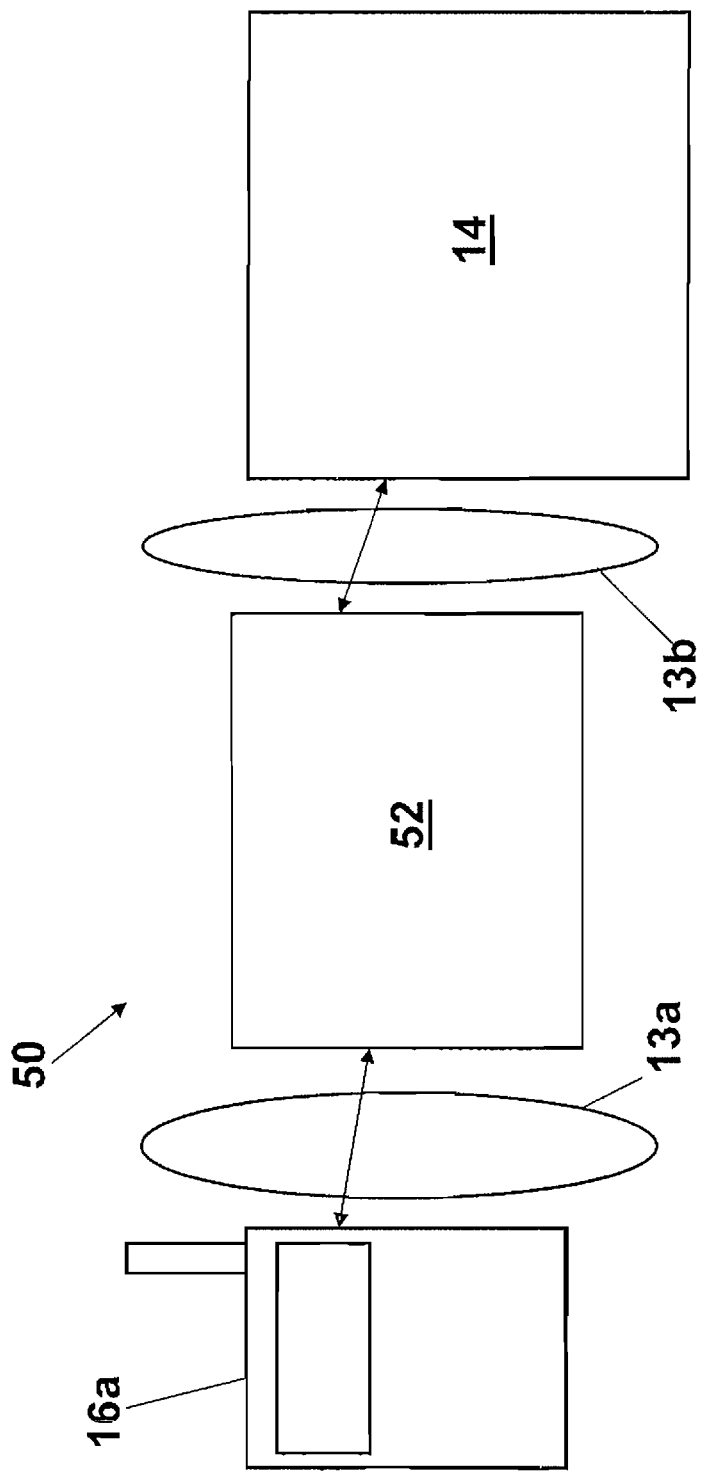
FIG. 5 illustrates a streaming active play system.

FIG. 5 illustrates a streaming active play system 50 in which the content may be streamed to the users in the active play system. The system 50 may include the one or more content devices, such as the mobile device with phone capabilities 16a that connect, over a link 13a, to a streaming unit 52, such as a stream server computer, that is in turn connected via a link 13b to the active play unit 14. In this embodiment, the streaming unit 52 may include an active play plug-in (that performs the same operations and functions as the active play client in each content device in FIG. 1). In this embodiment, each content device does not need to download the active play client. In this embodiment, the streaming unit 52 may serve/stream the content to the content devices. This embodiment may be particularly beneficial for content devices that cannot be modified (or download the active play unit client) such as content devices that do not allow downloads, etc. In addition, this embodiment also provides backwards compatibility for the system to older content devices.

In addition to the active play transfer method described above, the system also allows users to share the filepath/URL that describes the video to other web systems. When an active play compatible player encounters this filepath/URL, the player will start to play the content from previous playback location. This segmented sharing concept is designed to cater to the on-line video applications and players.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An active play unit for connection with one or more content devices over a link, the active play unit comprising:
    an active play content store that stores data about each of a plurality of pieces of content associated with the active play unit, the data including an identifier of a location in a piece of content of the plurality of pieces of content, wherein a playing of the piece of content was halted at the location;
    wherein the active play unit is configured to:
        receive a query from the one or more content devices over the link whether the piece of content is stored in the active play unit;

send, if the piece of content is stored in the active play unit, the identifier to the content device;

obtain, if the piece of content is not stored in the active play unit, the piece of content into the active play unit and store data about the identifier into the active play unit; and reformat the piece of content for each of the one or more content devices where the piece of content is played.

2. The active play unit of claim 1, wherein the active play unit is further configured to receive a plurality of identifiers of locations for the piece of content played by the one or more content devices.

3. The active play unit of claim 1, wherein the identifier further comprises a time code.

4. The active play unit of claim 1, wherein the identifier further comprises a timestamp.

5. The active play unit of claim 1, wherein the active play content store stores the plurality of pieces of content associated with the active play unit.

6. The active play unit of claim 1, wherein the one or more content devices is one of a mobile device with phone capabilities, a Blackberry device, an Apple iPhone, a mobile phone, a cellular phones, a set top box device, and a game device.

7. The active play unit of claim 1, wherein the active play unit is one or more server computers.

8. The active play unit of claim 1, wherein the link further comprises one of a computer network, a communications network, a cable network and a satellite network.

9. A method for use by an active play unit for connection with one or more content devices over a link, the method comprising:

storing data about each of a plurality of pieces of content associated with the active play unit, the data including an identifier of a location in a piece of content of the plurality of pieces of content, wherein a playing of the piece of content was halted at the location;

receiving a query from the one or more content devices over the link whether the piece of content is stored in the active play unit;

sending, if the piece of content is stored in the active play unit, the identifier to the content device;

obtaining, if the piece of content is not stored in the active play unit, the piece of content into the active play unit and store data about the identifier into the active play unit; and reformatting the piece of content for each of the one or more content devices where the piece of content is played.

10. The method of claim 9 further comprising:

receiving a plurality of identifiers of locations for the piece of content played by the one or more content devices.

11. The method of claim 9, wherein the identifier further comprises a time code.

12. The method of claim 9, wherein the identifier further comprises a timestamp.

13. The method of claim 9 further comprising:

storing the plurality of pieces of content associated with the active play unit.

14. The method of claim 9, wherein the one or more content devices is one of a mobile device with phone capabilities, a Blackberry device, an Apple iPhone, a mobile phone, a cellular phones, a set top box device, and a game device.

15. The method of claim 9, wherein the active play unit is one or more server computers.

16. The method of claim 9, wherein the link further comprises one of a computer network, a communications network, a cable network and a satellite network.

17. A content device for use with an active play unit comprising an active play content store that stores data about each of a plurality of pieces of content associated with the active play unit, the data further comprising an identifier of a location in a piece of content of the plurality of pieces of content, wherein a playing of the piece of content was halted at the location, the content device comprising:

a processing unit configured to:

connect to the active play unit over a link;

query the active play unit if the piece of content is stored in the active play unit;

obtain, if the piece of content is stored in the active play unit, the identifier; and send, if the piece of content is not stored in the active play unit, the piece of content into the active play unit and provide data about the identifier; and an active play module that allows the piece of content to be played on the content device in a format appropriate for the content device wherein the piece of content is played, using the identifier, at the location at which the playing of the piece of content was halted on another content device.

18. The content device of claim 17, wherein the active play module sends a plurality of identifiers of locations for the piece of content played by the content device of the active play module that indicate the locations in the piece of content played by the content device.

19. The content device of claim 17, wherein the identifier further comprises a time code.

20. The content device of claim 17, wherein the content device is one of a mobile device with phone capabilities, a Blackberry device, an Apple iPhone, a mobile phone, a cellular phones, a set top box device, and a game device.

* * * * *